United States Patent
Glass et al.

(10) Patent No.: US 12,522,750 B2
(45) Date of Patent: Jan. 13, 2026

(54) ADHESIVE MATERIAL HAVING MICROSTRUCTURES AND PERMEATION-RESISTANT PROPERTIES

(71) Applicant: Shin-Etsu Chemical Co., Ltd., Tokyo (JP)

(72) Inventors: Paul Samuel Glass, Pittsburgh, PA (US); Aimee L. DeLuca, Pittsburgh, PA (US); Burak Aksak, Pittsburgh, PA (US)

(73) Assignee: Shin-Etsu Chemical Co., Ltd., Tokyo (JP)

(*) Notice: Subject to any disclaimer, the term of this patent is extended or adjusted under 35 U.S.C. 154(b) by 242 days.

(21) Appl. No.: 17/909,798

(22) PCT Filed: Feb. 28, 2022

(86) PCT No.: PCT/US2022/018194
§ 371 (c)(1),
(2) Date: Sep. 7, 2022

(87) PCT Pub. No.: WO2022/220936
PCT Pub. Date: Oct. 20, 2022

(65) Prior Publication Data
US 2024/0209235 A1 Jun. 27, 2024

Related U.S. Application Data

(60) Provisional application No. 63/154,339, filed on Feb. 26, 2021.

(51) Int. Cl.
*C09J 7/00* (2018.01)

(52) U.S. Cl.
CPC ........... *C09J 7/00* (2013.01); *C09J 2301/206* (2020.08); *C09J 2301/31* (2020.08)

(58) Field of Classification Search
CPC ............ C09J 2301/31; C09J 2301/206; A41D 13/1176
See application file for complete search history.

(56) References Cited

U.S. PATENT DOCUMENTS

| | | | |
|---|---|---|---|
| 9,079,215 B2 | 7/2015 | Sitti et al. | |
| 9,605,181 B2 * | 3/2017 | Lu | ................... C09J 7/00 |
| 2010/0136281 A1 | 6/2010 | Sitti | |
| 2015/0329743 A1 | 11/2015 | Lu et al. | |
| 2015/0368519 A1 | 12/2015 | Sitti et al. | |
| 2015/0376465 A1 | 12/2015 | Sitti | |

OTHER PUBLICATIONS

International Search Report and Written Opinion of the International Searching Authority for PCT Application PCT/US2022/018194 dated Oct. 26, 2022.
Aranzazu del Campo et al. Contact Shape Controls Adhesion of Bioinpired Fibrillar Surfaces, Langmuir, published on web Aug. 28, 2007, pp. 10235-10243, vol. 23, American Chemical Society.

\* cited by examiner

*Primary Examiner* — Frank J Vineis
*Assistant Examiner* — Laura B Figg (57) ABSTRACT

An adhesive material providing permeation-resistant characteristics, wherein the material comprises a surface having a plurality of microstructures interspersed with at least one ridge. The ridge is adapted to make continuous contact with a mating surface. In one embodiment, the ridge is linear. In an alternative embodiment, the ridge has a square pattern forming a mesh on the surface.

19 Claims, 7 Drawing Sheets

ADHESIVE MATERIAL HAVING MICROSTRUCTURES AND PERMEATION-RESISTANT PROPERTIES

CROSS-REFERENCE TO RELATED APPLICATIONS

This application is a PCT International Application claiming priority to U.S. Provisional Application Ser. No. 63/154,339, filed on Feb. 26, 2021, which is incorporated by reference herein in its entirety.

STATEMENT REGARDING FEDERALLY SPONSORED RESEARCH

This invention was made with government support under Department of Defense SBIR Phase I contract from Jul. 8, 2016-Jan. 31, 2017. The government has certain rights in this invention.

BACKGROUND OF THE INVENTION

The present disclosure relates generally to dry adhesives. More specifically, the disclosure relates to a class of engineered microstructured materials whose surface geometry gives it the ability to prevent permeation across an interface between the material and another object or material, while maintaining adequate adhesion to the surface of the other object or material, allowing it to be used for a range of bonding or sealing applications.

There are many situations where an adhesive or closure system must be able to withstand high pressure, remain flexible, and resist permeation to protect against dangerous or damaging infiltration of fluids across an interface. For military defense applications and for personal protective equipment, there is a need for fasteners which prevent the permeation of chemical/biological (CB) agents or viruses such as Ebola or SARS-COV-2 across the interface. These include seals on collective protection systems, inflatable shelters, vestibule attachments, body bags, CB protective apparel, or hermetic systems for transportation of sick individuals.

Conventional fastening options for such applications generally consist of zippers, hook and loop closures, or zip-track systems. However, these systems all include problematic drawbacks for critical applications. Among other deficiencies, zippers and hook and loop systems are inflexible, are difficult to decontaminate, and do not provide hermetic sealing for high pressure applications. Zip-track systems are difficult to install and use in field conditions, require secondary closures at the end of the track, and take on creases in storage which make them susceptible to permeation. Therefore, it would be advantageous to develop a permeation-resistant adhesive material for use in a variety of applications.

BRIEF SUMMARY

In one embodiment, the dry adhesive material comprises a surface with microstructures, which may include two categories of microstructures: (1) adhesive arrays inspired by the foot-hairs found on geckos; and (2) continuous or semi-continuous elastomeric microridge interfaces which provide sealing performance capable of preventing fluid (gas or liquid) permeation for a wide range of applications. Unlike conventional pressure sensitive adhesives or glues, these materials are completely dry, which results in residue-free attachment and detachment and corresponding reusability. Unlike previously developed biologically-inspired dry adhesives based on gecko foot structures, the invention can also resist permeation of fluids due to the ridge-like interfaces. In biologically-inspired dry adhesives known in the art, the surface of the adhesive material contains a plurality of column-like structures with open space between adjacent structures and is, therefore, not permeation-resistant. This material of the present invention allows for a robust yet reversible attachment of two surfaces while resisting the permeation of fluids across an interface.

The material can be used to replace conventional closures such as hook and loop, zip-track, or mechanical fasteners for applications which require resistance of chemical or biological contaminants for applications in the following industries: defense, medical, personal protective equipment, industrial equipment, etc. Additionally, robust yet reversible in the presence of cutting, grinding, or polishing fluids can increase yields and decrease downtime during certain industrial manufacturing applications in the optics and semiconductor markets.

DETAILED DESCRIPTION

In one embodiment, the adhesive material 100 comprises a manufactured three-dimensional structured surface 103 having arrays of dry adhesive microfibers 101 and microridges 102. The materials 100 are fabricated using a multi-step process. First, vertical-walled microstructured array templates can be produced in silicon, glass, metal, plastic, or other materials known in the art of microfabrication using one or more established microfabrication methods, including photolithography, laser engraving, deep reactive ion etching, laser sintering, grey-scale lithography, 3D printing, among other microfabrication methods. For example, the microstructured templates can be produced from silicon using photolithography and deep reactive ion etching.

Figure 1:
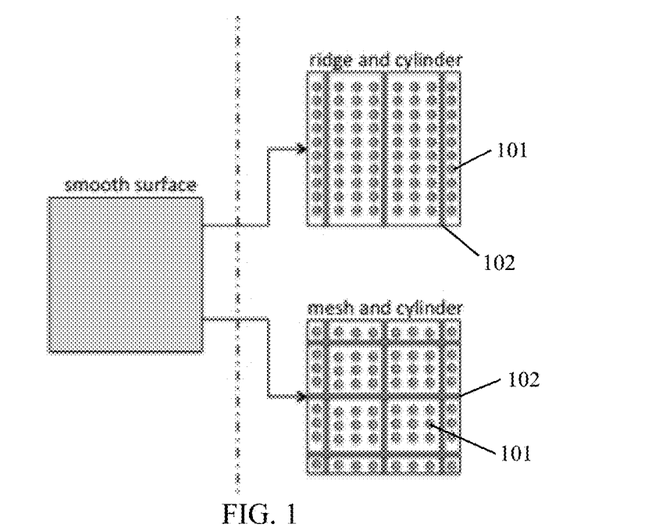
FIG. 1 shows configurations of the microridge and/or micromesh elements of the material according to two different embodiments.

In one embodiment, the permeation resistant elements of the material 100 comprise linear ridges 102, spaced with a uniform or non-uniform pitch. As shown in FIG. 1, the ridges 102 can be arranged in a variety of patterns, including a linear arrangement and a mesh pattern. The area between the ridges 102 can include areas of arrays of discrete microcylinders (or microfibers) 101 which may be engineered for optimized (depending on the application) adhesive purposes. In another embodiment, the permeation-resistant elements 102 of the material 100 consist of a mesh, or grid, of closed prismatic elements 102. Within each prismatic element 102 is an array of discrete microcylinders 101 which may be engineered for optimized adhesive purposes. For systems where permeation must be resisted from a single edge, such as the fastener on a piece of CB apparel, the continuous ridge design can be employed. For systems where permeation must be resisted around the perimeter of an object, such as polishing an optical lens in the presence of a fluid, the mesh design may offer benefits over the continuous ridge design. FIG. 1 shows the design of the master template patterns to be fabricated for closure sides. Partial patterns are shown for illustration purposes.

In one embodiment, the material 100 includes cylinders 101 with a height of about 150 um and a diameter of about 150 um extending from the surface 103 of the material 100. The pitch, or space, between cylinders 101 is 300 um. The ridge 102 width and height are 150 um and the ridge pitch is 3000 um. The profile (i.e. cross-sectional profile) of the ridges 102 may have square walls. They may also have different, non-uniform profiles, such that the base of the ridge 102 where it intersects with the material surface 103 is increased in width compared with the midpoint of the ridge 102 wall height. They may additionally have larger terminal end widths than the midpoint of the ridge 102 wall height, with or without the enlarged base width. In one embodiment, the mesh geometry, or the perimeter of a mesh pattern, is 3000 um×3000 um. In other embodiments, the cylinder 101 diameter may range from 10 um to 1 mm, the cylinder 101 height may range from 10 um to 1 mm, the ridge 102 width may range from 10 um to 3 mm, the pitch (or distance) between adjacent cylinders 101 ranges from 1.2-3× the cylinder 101 diameter, and the pitch between adjacent ridges 102 ranges from 2-200× the cylinder pitch. In some embodiments, the mesh patterns are four-sided polygons with an average length of 100 um-10 mm per polygon edge. In other embodiments, the mesh pattern may range from 3-8 sided polygons. In one embodiment, the height of the cylinders 101 and ridges 102 measured from the surface 103 of the material 100 is the same. In an alternative embodiment, the ridge 102 may have a height greater than or less than the height of the cylinders 101.

The adhesive material 100 can be produced through a molding process using fabricated templates. Micropatterned master templates can be cast using an elastomeric resin to produce compliant replicas of the master template. In one embodiment, a Shore 90A aliphatic polyurethane resin is used to produce a compliant replica of the master template. In certain embodiments where higher adhesion values are required, a secondary additive transfer printing process can be used to shape the tip geometry of the ridge 102 and microcylinders 101 of the template. By enlarging the tip geometry while maintaining flat co-planar tips, adhesion can be significantly enhanced. In certain embodiments, the secondary transfer printing process is used to form mushroom tips on the microstructures 101/102. The goal of the additive transfer printing process is generally to increase the size of the mushroom tips and without merging of tips that occurs by the wetting of two adjacent tips. This can be accomplished by controlling various parameters involved in the process which can affect the final fiber geometry and uniformity of the tips such as: (i) mechanical and surface properties of the material used to make the master template; (ii) material used to make the tips; and (iii) coated thickness of the material used to make the tips.

The thickness of the coating used to make the tips can be controlled via draw-down, slot die, spin coating processes, gravure coating processes, flexographic printing processes, or other processes used to deposit thin, uniform liquid layers onto a surface. The viscosity of the resin to make the coated film also plays a significant role in determining the ultimate geometric parameters of the tips.

Figure 2:
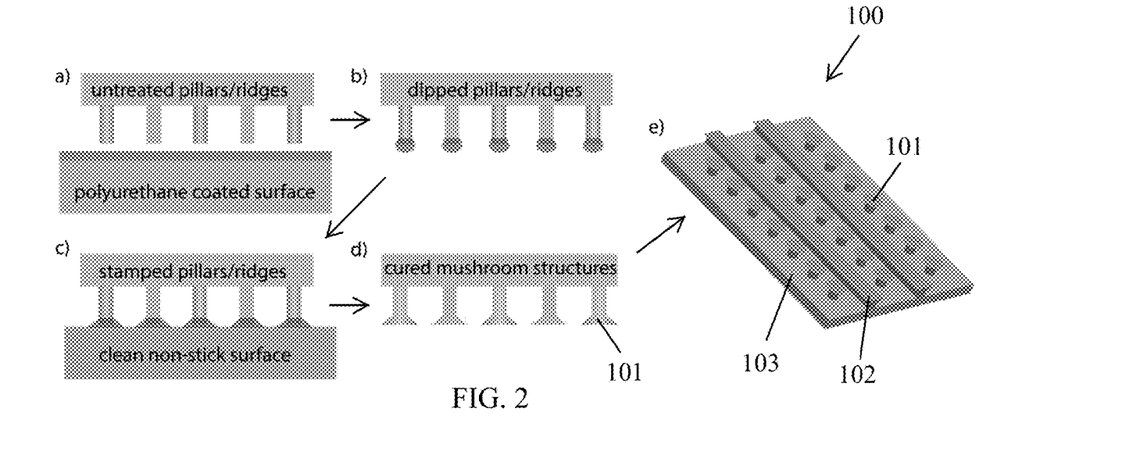
FIG. 2 is a flowchart depicting the process of forming the adhesive material.

Once the templates are prepared, mushroom-shaped adhesive tips can be engineered to the cylinder 101 and ridge 102 microstructures. A thin layer of liquid polyurethane can be deposited onto a surface using spin coating. FIG. 2 shows the dipping process for fabrication of fibers 101 with mushroom-shaped tips, with an example adhesive 100 shown in FIG. 2 (right). The compliant replica of the master template can be aligned with the plate (FIG. 2—upper left), dipped into the liquid layer, retracted (FIG. 2—upper middle), and then placed onto a smooth substrate or non-stick surface and cured (FIG. 2—lower left). Once the array is cured, the fibers 101 and/or ridges 102 are carefully peeled away from the surface, resulting in the final material geometry (FIG. 2—lower middle). The resulting structure is shown (FIG. 2—right), wherein the areas of adhesive microfibers 101 and continuous sealing ridges 102 are apparent.

Once mushroom tips are successfully added to templates, the microstructure arrays can be mounted on a rigid plate and replicated. A semi-transparent condensation cure silicone can be mixed, degassed, poured over modified-tipped microstructures and cured, resulting in a negative casting of the formed microstructure. This negative casting mold of the mushroom-like structures can then be cast with a material of choice to produce the resulting material 100. These molds are reusable. While the above steps are time consuming and require expensive microfabricated input materials, these processes only need to be performed once to develop a desired microfiber-adhesive template. This reusable negative casting mold can be cast repeatedly, quickly, and inexpensively to produce materials for evaluation.

The material 100 can be manufactured at mass scale from the reusable negative casting using one of the commercial molding processes described below, but not limited to:

A. Injection molding: injection overmolding, co-injection molding, gas assist injection molding, tandem injection molding, ram injection molding, micro-injection molding, vibration assisted molding, multiline molding, counterflow molding, gas counterflow molding, melt counterflow molding, structural foam molding, injection-compression molding, oscillatory molding of optical compact disks, continuous injection molding, reaction injection molding (liquid injection molding, soluble core molding, insert molding), and vacuum molding;

B. Compression molding: transfer molding and insert molding;

C. Thermoforming: pressure forming, laminated sheet forming, twin sheet thermoforming, and interdigitation;

D. Casting: encapsulation, potting, and impregnation;

E. Coating Processes: spray coating, powder coatings, vacuum coatings, microencapsulation coatings, electrodeposition coatings, floc coatings, and dip coating;

F. Blow molding: injection blow molding, stretch blow molding, and extrusion blow molding;

G. Vinyl Dispersions: dip molding, dip coatings, slush molding, spray coatings, screened inks, and hot melts; and H. Composite manufacturing techniques involving molds: autoclave processing, bag molding, hand lay up, and matched metal compression.

Certain embodiments of the invention can be manufactured using coating processes using UV-curable polyurethane acrylate resins on a PET backing film.

Figures 3, 4A:
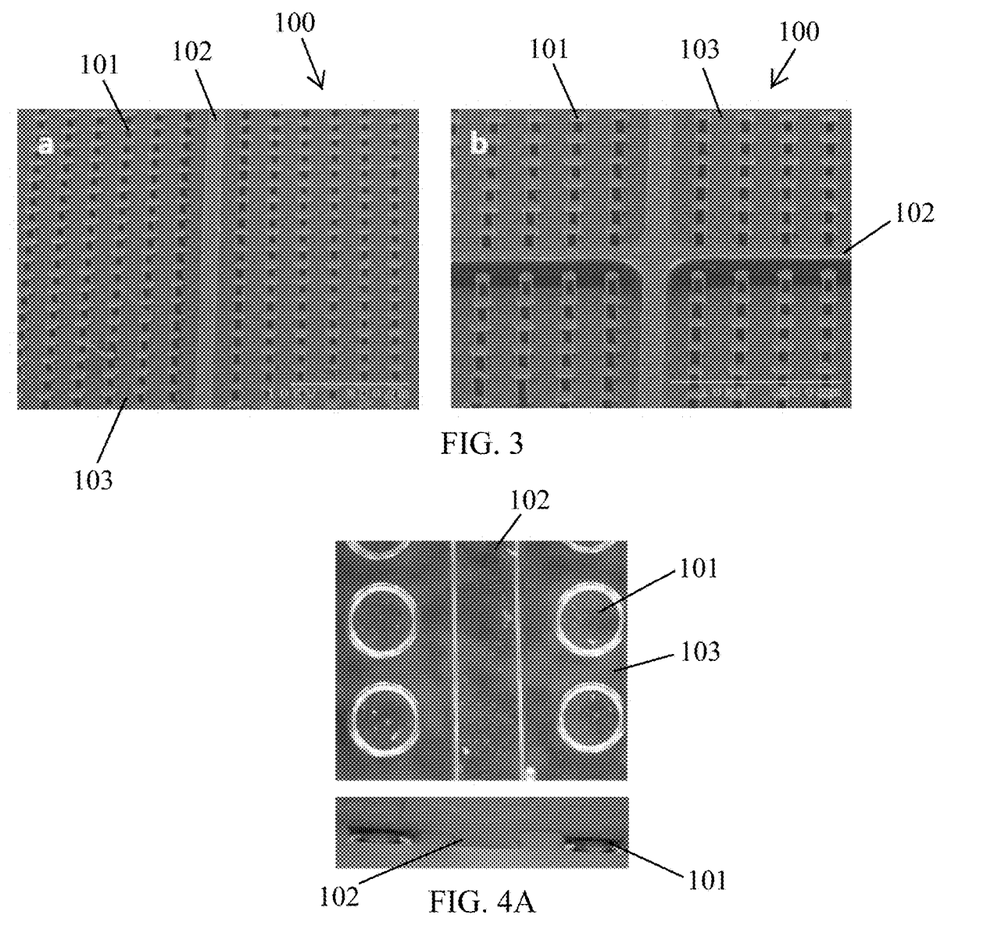
FIG. 3 is an image of the microstructures of the material, according to one embodiment.
FIGS. 4A-4B are various images, including a profile image, of the adhesive material.

Scanning electron microscopy (SEM) images of certain embodiments of the invention are shown in FIG. 3. FIG. 3 (left) shows cylinders 101 and ridges 102 linearly disposed on a surface 103 of the microstructured array material 100. In another example, FIG. 3 (right) shows cylinders 100 and ridges 102 arranged in a mesh pattern, forming the microstructured array material 100. The scale bar in FIG. 3 is 500 µm to give a perspective of the dimensions of the cylinders 101 and ridges 102.

Figure 4B:
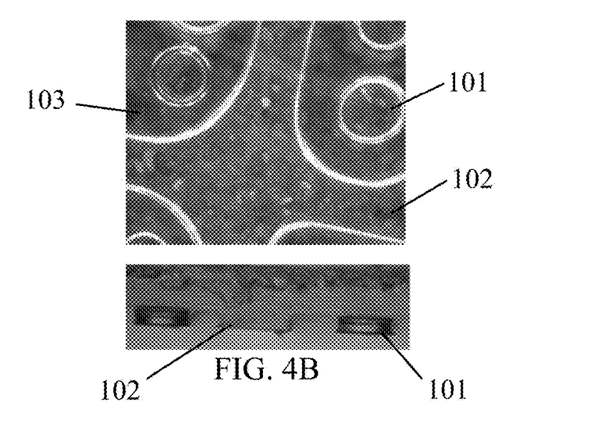

Each of FIG. 4A and FIG. 4B depict a top view (top) and side view (bottom) of example materials 100. FIGS. 4A-4B are optical microscopy images of embodiments of the material 100. The cylinder and linear ridge embodiment is shown in FIG. 4A. The mesh pattern embodiment is shown in FIG. 4B.

Figure 5:
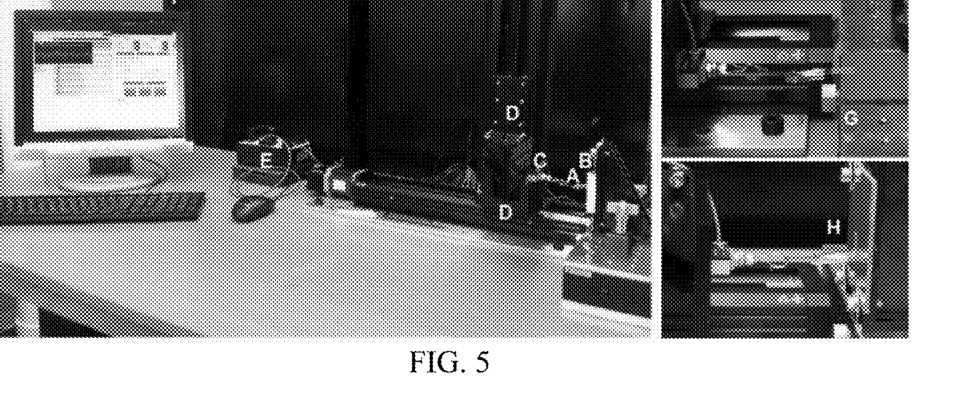
FIG. 5 is an image of a testing set-up.

The utility of the material 100 for adhesive applications can be demonstrated using shear and peel testing protocols on custom testing equipment, as shown in FIG. 5. The top right image of FIG. 5 is a close up of the shear test sample set-up and the bottom right image is a close up of the 90 degree peel test sample set-up. With this system, 1 cm wide strips of manufactured material 100 were mounted to an acrylic cantilever, which was attached via a flexible thread to a load cell (MLP-25, Transducer Techniques). The load cell was fixed to a linear motorized stage (A-LST0250A-KT07, Zaber Technologies Inc.). For each series of tests, the interlocking mating surface was prepared and clamped to the manual linear stage (Optosigma) as the substrate for the closure sample. An area of the sample of fabricated material 100 was carefully aligned and pressed into contact with the mating closure surface using a 4.5 lb. weighted roller (ChemInstruments). Upon contact a constant dwell time of 1 minute was maintained between the material 100 and the mating surface and testing was initiated. Custom software was used to retract the stage away from the substrate while measuring the shear force at the interface of the closure through changes in the load cell voltage until the sample of material 100 became detached from the surface. Load cell voltage was conditioned through a signal conditioner (TMO-2, Transducer Techniques) and routed through a shielded connector-block (SCB-68A, National Instruments) to be collected by a DAQ card (NI-PCI-6221, National Instruments) installed in the laboratory computer. The shear strength test for each developed configuration was repeated five times. An inset image illustrating the shear testing sample orientation for system is shown on the top right of FIG. 5.

Figure 6:
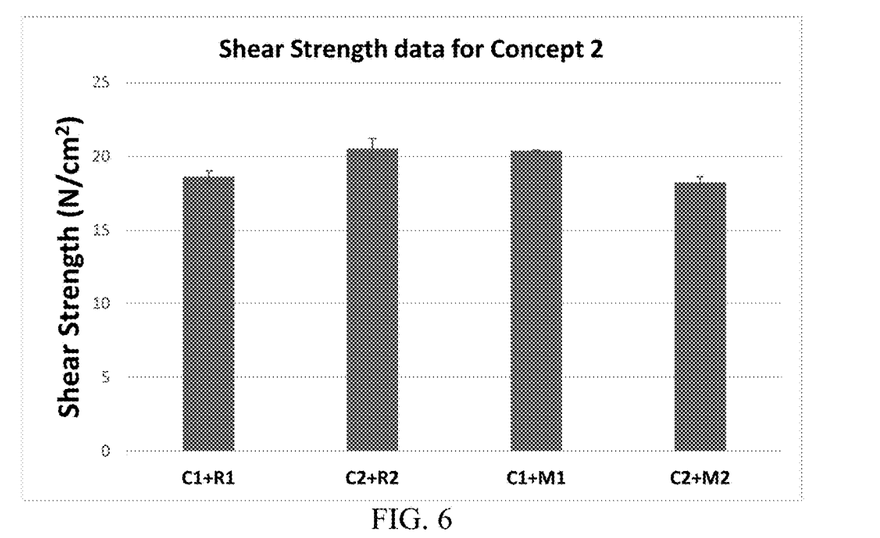
FIG. 6 is a graph showing shear strength.
Figure 7:
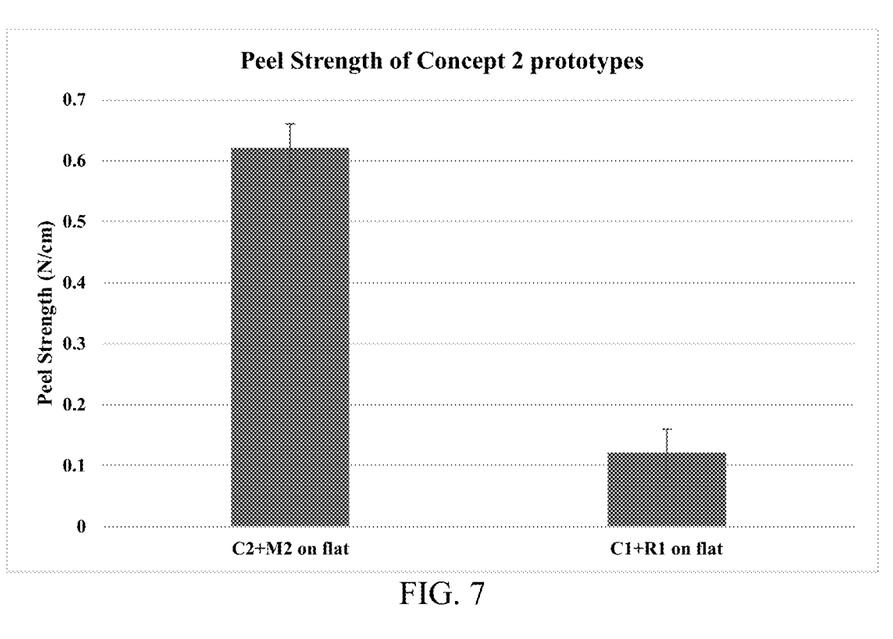
FIG. 7 is a graph showing peel strength.

Two different sets of the linear ridge embodiment (C1+R1, C2+R2) and the mesh pattern embodiment (C1+M1, C1+M2) embodiments were tested in shear in contact with a flat polyurethane surface (results shown in FIG. 6), and a sample of each embodiment (C1+R1, C2+M2) was tested in 90 degree peel on a flat polyurethane surface (results shown in FIG. 7).

Figure 8A:
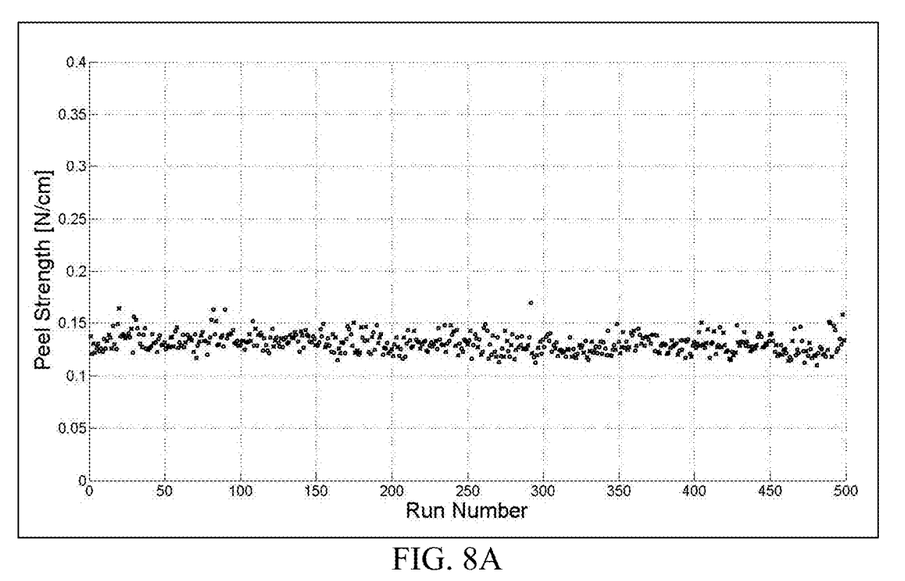
FIGS. 8A-8B are graphs showing various characteristics of the microstructures.
Figure 8B:
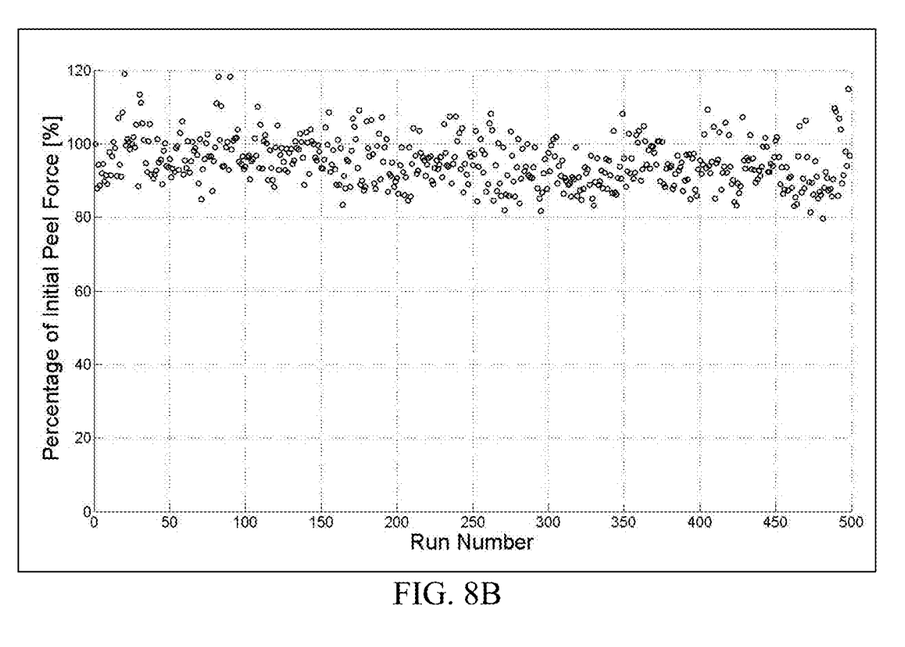

The described peel testing protocol can be automated to test the performance in peel repeatedly. To demonstrate the value of the material 100 over adhesive glues (which can only be attached once; detachment is destructive to the interface) and conventional pressure sensitive tapes (which rapidly deteriorate with attachment and detachment and cannot demonstrate repeatable performance beyond several such cycles), the peel testing protocol was repeated 500 times consecutively over a 12-hour period. Data for the 500 cycles of testing of a linear embodiment is shown in FIGS. 8A-8B, with performance consistent between 80%-120% of the initial peel strength, even after 500 cycles. FIG. 8A shows the 90 degree peel strength and FIG. 8B shows the percentage of initial peel strength of closure sample over 500 cycles.

Permeation Resistance

Figure 9A:
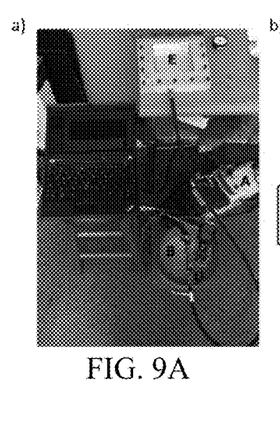
FIGS. 9A-9C depict an experimental set-up to test adhesion and permeation properties of the adhesive material.
Figures 9B, 9C:
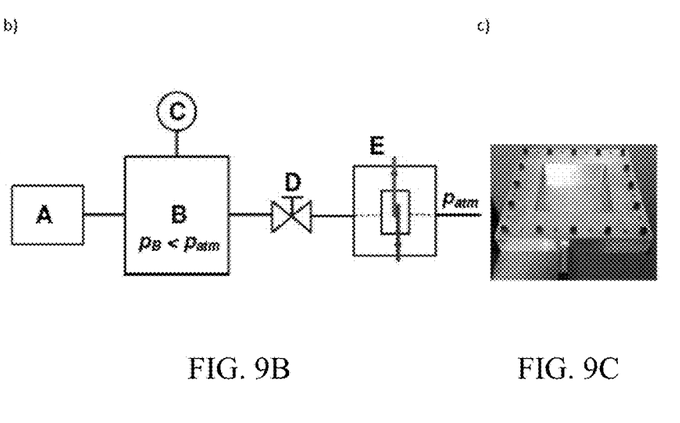

Evaluation of the permeation resistance of the material 100 in contact with a polyurethane film was tested using a custom permeation system, as shown in FIGS. 9A-9C. The material 100 and control (flat continuous polyurethane film) samples were mounted on an aluminum bracket with a cavity of 6"× 6"×1.5" (FIG. 9A) and fastened tightly by using a double-sided tape on the edges of the sample (6035 PC, 3M) to seal the perimeter of the sample to make the area leak-proof. Then, a vacuum pump (Maxima C Plus, Fisher Scientific) was used to draw an existing closed 1850 cm3 chamber to a differential pressure of 14 PSI (as measured by a manometer, General Tools DM8215 Deluxe Digital Manometer, 0-15 psi) when compared with atmospheric conditions and the pump was then turned off. A valve was then opened to introduce 4.5 PSI differential pressure gradient across the evaluated closure system, which was being held in place by the machined bracket. Data from the manometer was collected by software on a computer and saved for analysis. Before each closure permeation study is performed, a control test was conducted to measure the permeation of the entire system (including the pump, pressure vessel, and pneumatic fixtures and tubing). For this control testing, a flat piece of 7"×7" 10 mil TPU film was used. Referring again to FIGS. 9A-9C, the permeation testing set-up is shown in FIG. 9A; a schematic showing permeation testing set-up is shown in FIG. 9B; and an image showing the aluminum bracket with control sample attached (piece of flat PET) is shown in FIG. 9C.

Figure 10:
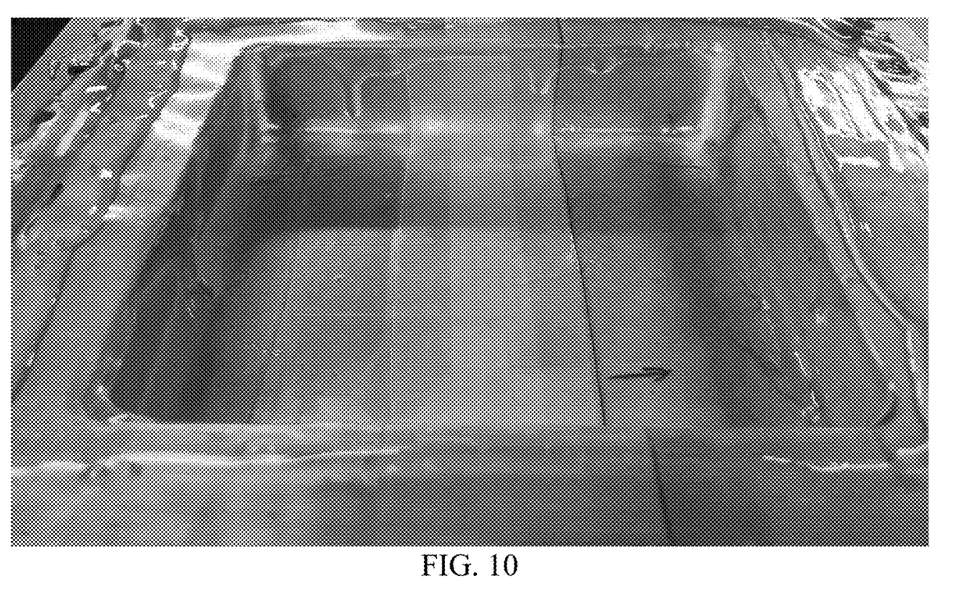
FIG. 10 is an image showing a permeation test set-up.
Figure 11:
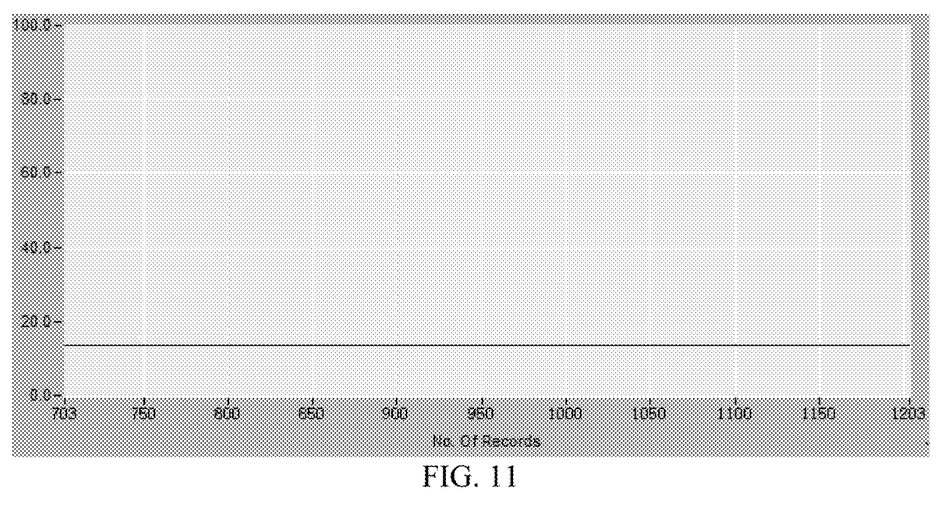
FIG. 11 is a graph depicting permeation test results.

The vacuum pressure of the system is generally increased to the high capacity of the vacuum pump (~13.5 PSI). Observations show that the closure system was successfully sustained and did not rupture or fail under this high vacuum pressure. FIG. 10 shows the permeation test being performed and the hermetic seal sustaining the high pressures. FIG. 11 shows the permeation test results obtained from the data logging software of the manometer. The Y axis shows the pressure in PSI and the x-axis shows the number of recordings made. The graph in FIG. 11 shows that the material 100 maintained pressure for the duration of the test, indicating that the material 100 remained stable under high pressure conditions. The data recorded was up to 1200 recordings (approximately around 20 minutes). The ability of these microstructured materials 100 to maintain a permeation-resistant seal, even in the presence of a significant pressure gradient, demonstrates their potential value for applications where fluid resistance is essential.

Polyurethane acrylates are described as one potential resin used to make the material 100. In other embodiments, the material 100 may be made from any of the following:

A. Thermosets:
  i. Formaldehyde Resins (PF, RF, CF, XF, FF, MF, UF, MUF);
  ii. Polyurethanes (PU);
  iii. Unsaturated Polyester Resins (UP);
  iv. Vinylester Resins (VE), Phenacrylate Resins, Vinylester Urethanes (VU);
  v. Epoxy Resins (EP);
  vi. Diallyl Phthalate Resins, Allyl Esters (PDAP);
  vii. Silicone Resins (Si); and
  viii. Rubbers: R-Rubbers (NR, IR, BR, CR, SBR, NBR, NCR, IIR, PNR, SIR, TOR, HNBR), M-Rubbers (EPM, EPDM, AECM, EAM, CSM, CM, ACM, ABM, ANM, FKM, FPM, FFKM), O-Rubbers (CO, ECO, ETER, PO), Q-(Silicone) Rubber (MQ, MPQ, MVQ, PVMQ, MFQ, MVFQ), T-Rubber (TM, ET, TCF), U-Rubbers (AFMU, EU, AU) Text, and Polyphosphazenes (PNF, FZ, PZ).

B. Thermoplastics i. Polyolefins (PO), Polyolefin Derivates, and Copolymers: Standard Polyethylene Homo- and Copolymers (PE-LD, PE-HD, PE-HD-HMW, PE-HD-UHMW, PE-LLD); Polyethylene Derivates (PE-X, PE+PSAC); Chlorinated and Chloro-Sulfonated PE (PE-C, CSM); Ethylene Copolymers (ULDPE, EVAC, EVAL, EEAK, EB, EBA, EMA, EAA, E/P, EIM, COC, ECB, ETFE; Polypropylene Homopolymers (PP, H-PP);

ii. Polypropylene Copolymers and -Derivates, Blends (PP-C, PP-B, EPDM, PP+EPDM);

iii. Polybutene (PB, PIB);

iv. Higher Poly-α-Olefins (PMP, PDCPD);

v. Styrene Polymers: Polystyrene, Homopolymers (PS, PMS); Polystyrene, Copolymers, Blends; Polystyrene Foams (PS-E, XPS);

vi. Vinyl Polymers: Rigid Polyvinylchloride Homopolymers (PVC-U); Plasticized (Soft) Polyvinylchloride (PVC-P); Polyvinylchloride: Copolymers and Blends; Polyvinylchloride: Pastes, Plastisols, Organosols; Vinyl Polymers, other Homo- and Copolymers (PVDC, PVAC, PVAL, PVME, PVB, PVK, PVP);

vii. Fluoropolymers: FluoroHomopolymers (PTFE, PVDF, PVF, PCTFE); Fluoro Copolymers and Elastomers (ECTFE, ETFE, FEP, TFEP, PFA, PTFEAF, TFEHFPVDF (THV), [FKM, FPM, FFKM]);

viii. Polyacryl- and Methacryl Copolymers;

ix. Polyacrylate, Homo- and Copolymers (PAA, PAN, PMA, ANBA, ANMA);

x. Polymethacrylates, Homo- and Copolymers (PMMA, AMMA, MABS, MBS);

xi. Polymethacrylate, Modifications and Blends (PMMI, PMMA-HI, MMA-EML Copolymers, PMMA+ABS Blends;

xii. Polyoxymethylene, Polyacetal Resins, Polyformaldehyde (POM): Polyoxymethylene Homo- and Copolymers (POM-H, POM-Cop.); Polyoxymethylene, Modifications and Blends (POM+PUR);

xiii. Polyamides (PA): Polyamide Homopolymers (AB and AA/BB Polymers) (PA6, 11, 12, 46, 66, 69, 610, 612, PA 7, 8, 9, 1313, 613); Polyamide Copolymers, PA 66/6, PA 6/12, PA 66/6/610 Blends (PA+: ABS, EPDM, EVA, PPS, PPE, Rubber); Polyamides, Special Polymers (PA NDT/INDT [PA 6-3-t], PAPACM 12, PA 6-I, PA MXD6 [PARA], PA 6-T, PA PDA-T, PA 6-6-T, PA 6-G, PA 12-G, TPA-EE); Cast Polyamides (PA 6-C, PA 12-C); Polyamide for Reaction Injection Molding (PA-RIM); Aromatic Polyamides, Aramides (PMPI, PPTA);

xiv. Aromatic (Saturated) Polyesters: Polycarbonate (PC); Polyesters of Therephthalic Acids, Blends, Block Copolymers; Polyesters of Aromatic Diols and Carboxylic Acids (PAR, PBN, PEN);

xv. Aromatic Polysulfides and Polysulfones (PPS, PSU, PES, PPSU, PSU+ABS): Polyphenylene Sulfide (PPS); Polyarylsulfone (PSU, PSU+ABS, PES, PPSU);

xvi. Aromatic Polyether, Polyphenylene Ether, and Blends (PPE): Polyphenylene Ether (PPE); Polyphenylene Ether Blends;

xvii. Aliphatic Polyester (Polyglycols) (PEOX, PPOX, PTHF);

xviii. Aromatic Polyimide (PI): Thermosetting Polyimide (PI, PBMI, PBI, PBO, and others); Thermoplastic Polyimides (PAI, PEI, PISO, PMI, PMMI, PESI, PARI);

xix. Liquid Crystalline Polymers (LCP);

xx. Ladder Polymers: Two-Dimensional Polyaromates and -Heterocyclenes: Linear Polyarylenes; Poly-p-Xylenes (Parylenes); Poly-p-Hydroxybenzoate (Ekonol); Polyimidazopyrrolone, Pyrone; Polycyclone;

xxi. Biopolymers, Naturally Occurring Polymers and Derivates: Cellulose- and Starch Derivates (CA, CTA, CAP, CAB, CN, EC, MC, CMC, CH, VF, PSAC); 2 Casein Polymers, Casein Formaldehyde, Artificial Horn (CS, CSF); Polylactide, Polylactic Acid (PLA); Polytriglyceride Resins (PTP®); xix. Photodegradable, Biodegradable, and Water Soluble Polymers;

xxii. Conductive/Luminescent Polymers;

xxiii. Aliphatic Polyketones (PK);

xxiv. Polymer Ceramics, Polysilicooxoaluminate (PSIOA);

xxv. Thermoplastic Elastomers (TPE): Copolyamides (TPA), Copolyester (TPC), Polyolefin Elastomers (TPO), Polystyrene Thermoplastic Elastomers (TPS), Polyurethane Elastomers (TPU), Polyolefin Blends with Crosslinked Rubber (TPV), and Other TPE, TPZ; and xxvi. Other materials known to those familiar with the art.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof. In particular, one or more features in any of the embodiments described herein may be combined with one or more features from any other embodiments described herein.

Protection may also be sought for any features disclosed in any one or more published documents referred to and/or incorporated by reference in combination with the present disclosure.

What is claimed is:

1. A permeation-resistant adhesive material comprising:
   an adhesive array, wherein the adhesive array comprises a plurality of fibers extending from a surface of the material; and
   a ridge extending from the surface,
   wherein each of the plurality of fibers has an enlarged shaped tip and includes a cylinder;
   a plurality of additional ridges are interspersed between the plurality of fibers,
   wherein a pitch between adjacent cylinders ranges from 1.2 to 3 times a diameter of the cylinder, and
   wherein a pitch between adjacent additional ridges ranges from 2 to 200 times the pitch between adjacent cylinders.

2. The adhesive material of claim 1, wherein the ridge is linear.

3. The adhesive material of claim 1, wherein the ridge forms a mesh pattern interspersed by the plurality of fibers.

4. The adhesive material of claim 1, wherein the ridge is continuous.

5. The adhesive material of claim 1, wherein the ridge is discontinuous.

6. The adhesive material of claim 1, wherein a gap is maintained between the ridge and adjacent fibers of the adhesive array.

7. The adhesive material of claim 1, wherein the ridge is disposed around a perimeter of the adhesive material.

8. The adhesive material of claim 1, further comprising:
a plurality of additional ridges interspersed between the plurality of fibers.

9. The adhesive material of claim 8, wherein a spacing between adjacent ridges of the plurality of additional ridges is uniform.

10. The adhesive material of claim 8, wherein a spacing between adjacent ridges of the plurality of additional ridges is non-uniform.

11. The adhesive material of claim 1, wherein the ridge forms a polygon.

12. The adhesive material of claim 1, wherein the plurality of fibers and the ridge have a same height.

13. The adhesive material of claim 1, wherein the ridge has a square cross-sectional profile.

14. The adhesive material of claim 1, wherein the enlarged shaped tip of each of the plurality of fibers has a flat surface that is co-planar with flat surfaces at the enlarged shaped tip of other of the plurality of fibers.

15. An adhesive material comprising:
an adhesive array, wherein the adhesive array comprises a plurality of pillars extending from a surface of the material; and
a ridge extending from the surface,
wherein each of the plurality of pillars has an enlarged shaped tip and includes a cylinder;
a plurality of additional ridges are interspersed between the plurality of pillars,
wherein a pitch between adjacent cylinders ranges from 1.2 to 3 times a diameter of the cylinder, and
wherein a pitch between adjacent additional ridges ranges from 2 to 200 times the pitch between adjacent cylinders.

16. The adhesive material of claim 15 wherein the enlarged shaped tip of each one of the plurality pillars has a flat surface that is co-planar with flat surfaces of the enlarged shaped tips of other of the plurality pillars.

17. The adhesive material of claim 15 wherein the enlarged shaped tip of the ridge is enlarged compared to a midpoint of the ridge.

18. The adhesive material of claim 15 wherein a diameter of the cylinder ranges from 10 um to 1 mm; a height of the cylinder ranges from 10 um to 1 mm; and a width of the ridge ranges from 10 um to 3 mm.

19. An adhesive material comprising:
an adhesive array, wherein the adhesive array comprises a plurality of pillars extending from a surface of the material; and
a ridge extending from the surface,
wherein each of the plurality of pillars includes a cylinder;
a plurality of additional ridges are interspersed between the plurality of pillars,
wherein a pitch between adjacent cylinders ranges from 1.2 to 3 times a diameter of the cylinder, and
wherein a pitch between adjacent additional ridges ranges from 2 to 200 times the pitch between adjacent cylinders.

* * * * *